US012623429B2

(12) United States Patent     (10) Patent No.:   US 12,623,429 B2

Farrell et al.       (45) Date of Patent:    May 12, 2026

(54) DRUM LAGGING MATERIAL

(71) Applicant: Albany International Corp, Rochester, NH (US)

(72) Inventors: Donald J. Farrell, Delmar, NY (US); Charles Pinson, Covington, LA (US); Kaz P. Raczkowski, Wynantskill, NY (US)

(73) Assignee: Albany International Corp., Portsmouth, NH (US)

( * ) Notice: Subject to any disclaimer, the term of this patent is extended or adjusted under 35 U.S.C. 154(b) by 0 days.

(21) Appl. No.: 19/012,292

(22) Filed: Jan. 7, 2025

(65) Prior Publication Data

US 2025/0144908 A1     May 8, 2025

Related U.S. Application Data

(60) Division of application No. 18/939,952, filed on Nov. 7, 2024, now Pat. No. 12,343,956, which is a
(Continued)

(51) Int. Cl.
    B31F 1/30       (2006.01)
    B32B 5/26       (2006.01)
    (Continued)

(52) U.S. Cl.
    CPC ................ B31F 1/30 (2013.01); B32B 5/263 (2021.05); D06N 3/0006 (2013.01);
    (Continued)

(58) Field of Classification Search
    None
    See application file for complete search history.

(56) References Cited

U.S. PATENT DOCUMENTS 1,659,883 A    2/1928   Lorentz
    2,959,453 A    11/1960   Jacobs
           (Continued)

FOREIGN PATENT DOCUMENTS

CH      622 595 A5    4/1981
    DE      2623437 A1    12/1977
           (Continued)

OTHER PUBLICATIONS

Watzi, Alfred: "Chances for Cost Saving in Production of Hygiene, Medical and Wipes Nonwovens by Spunlace/Air-Laid Combinations", Technical Textile.net, see https://technicaltextile.net/articles/chances-for-cost-saving-3155, accessed Jul. 24, 2023.

(Continued)

*Primary Examiner* — Arti Singh-Pandey

(74) *Attorney, Agent, or Firm* — McCarter & English, LLP

(57) ABSTRACT

Disclosed are lagging materials for use on a driven cylindrical pulley or drum for an industrial machine. A lagging material can comprise a seaming element along the cross-machine direction (CD) of each of the opposing ends of the lagging material for forming a seam for seaming opposing ends of a lagging material when brought together. A lagging material can also comprise coatings that increase the Coefficient of Friction of a lagging material when the lagging material is installed onto the drum such that no additional adhesive is required to keep the lagging on the drum circumference when in operation. Also described is an apparatus for installing an on machine seamable lagging including at least two opposed elongate members, such that when the elongate members are drawn together, the lagging material is stretched into a seamable position to be installed on the drum.

20 Claims, 11 Drawing Sheets

Related U.S. Application Data continuation of application No. 13/625,533, filed on Sep. 24, 2012, now abandoned.

(60) Provisional application No. 61/542,657, filed on Oct. 3, 2011, provisional application No. 61/538,470, filed on Sep. 23, 2011.

(51) Int. Cl.
| | |
|---|---|
| *D06N 3/00* | (2006.01) |
| *D21F 7/10* | (2006.01) |
| *F16G 3/16* | (2006.01) |

(52) U.S. Cl.
CPC ............. *D06N 3/0015* (2013.01); *D21F 7/10* (2013.01); *F16G 3/16* (2013.01); *D06N 2201/02* (2013.01); *D06N 2203/00* (2013.01); *D06N 2211/04* (2013.01); *F16C 2223/32* (2013.01); *Y10T 29/49826* (2015.01); *Y10T 29/53* (2015.01)

(56) References Cited

U.S. PATENT DOCUMENTS

| | | | | |
|---|---|---|---|---|
| 3,051,532 | A | 8/1962 | Collett | |
| 3,300,181 | A | 1/1967 | Spann | |
| 3,972,105 | A | 8/1976 | Miller et al. | |
| 5,611,374 | A | 3/1997 | Blin et al. | |
| 6,276,420 | B1 | 8/2001 | Lanthier | |
| 12,343,956 | B2 * | 7/2025 | Farrell | D06N 3/0015 |
| 2004/0035683 | A1 | 2/2004 | Huber | |
| 2004/0126544 | A1 * | 7/2004 | Jaglowski | B31F 1/2881 |
| | | | | 428/196 |
| 2006/0151303 | A1 | 7/2006 | Motoda | |
| 2006/0162312 | A1 | 7/2006 | Patel et al. | |
| 2008/0230199 | A1 | 9/2008 | Harwood | |
| 2009/0057105 | A1 | 3/2009 | Suelzle | |
| 2009/0107574 | A1 | 4/2009 | Bella | |
| 2011/0203758 | A1 | 8/2011 | Yazaki et al. | |
| 2011/0300981 | A1 | 12/2011 | Takahashi et al. | |

FOREIGN PATENT DOCUMENTS

| | | |
|---|---|---|
| DE | 60 2005 005154 T2 | 3/2009 |
| DE | 10 2008 002301 A1 | 12/2009 |
| EP | 2055831 A1 | 5/2009 |
| EP | 1812729 B1 | 8/2011 |
| FR | 2628453 A | 9/1989 |
| GB | 470261 | 8/1937 |
| JP | 56-2160 A | 1/1981 |
| JP | 06-212547 A | 8/1994 |
| WO | WO 2010/098091 A1 | 9/2010 |

OTHER PUBLICATIONS

Zhao, Joe et al.: "A Historical Perspective of Scientific Advances in Paper Forming Hydrodynamics: 1950-2000", *BioResources* 12(1), pp. 2125-2142.

BW PAPERSYSTEMS: "A Wet-End in Full Harmony—and Under Full Control", Jan. 11, 2023, see https://bwpapersystems.com/news-events/post/news-room/2023/01/12/a-wet-end-in-full-harmony-and-under-full-control, accessed Jul. 24, 2023. Both webpage and article, as printed in *International Paperboard Magazine* in Jan. 2023, are included.

Engineers Edge, "Coefficient of Friction Equation and Table Chart", copyright 2000-2020, by Engineer's Edge, LLC. See https://www.engineersedge.com/coefficients_of_friction.htm, accessed Nov. 12, 2020.

Liu, Frank: Product Brochure for Nanovea "Leather Coefficient of Friction Evaluation" © 2018 Nanovea.

Habasit, Services: "Natural Rubber (NR)" copyright Habasit, 2020, http://www.habasit.com/en/natural-rubber.htm.

Encyclopaedia Britannica: "Polyethylene", published by Encyclopedia Britannica, Inc. Nov. 15, 2019, https://www.britannica.com/science/polyethylene, accessed Feb. 24, 2020, pp. 1-4.

Editor: Dick, John S.: "Table 4.2—Standard Abbreviations for Commercially Available Synthetic Elastomers Based on ASTM D 1418", *Basic Rubber Testing: Selection Methods for a Rubber Test Program*, p. 74, ASTM International Copyright 2003, ASTM Stock No. MNL39, https://books.google.com/books?id=VOVAHZyHyPAC&pg=PA74&lpg=PA74&dq=EOM+rubber&source=bl&ots+yuT_aYkdoP&sig=ACfU3U3qDRLxh7_mdC3jgS6-L1MHBq3C5Q&h1=en&sa=X&ved=2ahUKEwibjZne1PvkAhVFTt8KHUjyCO406AEwEnoECAcQAQ#v=onepage&q=EOM%20rubber&f=false, accessed Oct. 25, 2019.

MatWeb, Material Property Data: "Reliance Industries Reclair O19010 Polyethylene", http://www.matweb.com/search/datasheet.aspx?matguid=4523d66f24454369b8226a507a21bd65, accessed Feb. 24, 2020. pp. 1-2.

Instrumentation, Traids, FR-EPR, CPE, STOS, Type TC-ER, 600V, http://www.usawire-cable.com/pdf/8-triads-fr-epr-cpe-stos-type-tc.pdf, accessed Oct. 25, 2019. p. 1.

SpectraTurf: "SpectraTop: Pour-in-Place EPDM Rubber Surfacing", https://www.spectraturf.com/systems/spectratop/, accessed Oct. 29, 2019. pp. 1-4.

SpectraTop Specification, SpectraTurf, Part 1 General, Part 2 Products, Part 3 Execution, pp. 1-8.

Bando: "Bando Power transmission belt selector", Revised 10, Product information brochure, pp. 1-62.

Ero Joint: "Technical Information about Timing Belts", https://www.ero-joint.com/en/technical-information-about-timing-belts, accessed Feb. 25, 2020.

Mascia, Leno: "49. Ethylene Polymers", *Polymers in Industry from A-Z, A Concise Encyclopedia*, copyright 2012, Wiley-VCH Verlag GmbH & Co. KGaA.

*The Industrial Wiki, "Conveyor Basics"*, https://www.myodesie.com/wiki/index/returnEntry/id/3051, accessed Jul. 27, 2018.

American Roller Company, "Surface Roughness of Rollers", https://americanroller.com/related-resources/surface-roughness-rollers/, accessed Jul. 27, 2018.

Chou, Chuen-Shii, "Optimum Conditions for vulcanizing a fabric conveyor belt with better adhesive strength and less abrasion", *Materials & Design*, vol. 44, Feb. 2013, Abstract, https://www.sciencedirect.com/science/article/pii/S0261306912004815?via%3Dihub, accessed Jul. 27, 2018.

Product Brochure for BRICQ S.A.S., "Belts BRICQ-Four", Montbron, France, http://www.bricq.fr/wp-content/uploads/2014/04/BRICQ-FOUR-GB.pdf, accessed Nov. 6, 2017.

Nitta "Conveyor Belts with a low coefficient of friction", https://www.nittacorporation.com/en/applications/logistics/conveyor-belts-low-friction.html, accessed Nov. 6, 2017.

Gallagher "Urethane Coefficient of Friction/Custom Polyurethane Parts", https://gallaghercorp.com/design-guide/polyurethane-coefficient-friction/, accessed Nov. 6, 2017.

Novathane, "Polyurethane", http://www.novathanedirect.com/polyurethane, accessed Nov. 6, 2017.

Product Brochure, Dupont, "Delrin, Acetal Resin" "Low Wear Low Friction", http://www.emcoplastics.com/.../Delrin%20Low%20Wear%20Low%20Friction%20Brochure, accessed Oct. 12, 2017.

Product Brochure, Dupont, "Delrin, Acetal Resin" "Module III" "Design Information", http://www2.dupont.com/Plastics/en_US/assets/downloads/design/DELDGe.pdf, accessed Nov. 6, 2017.

Sunray Inc., "Understanding Polyurethane Coefficient of Friction", https://www.slideshare.net/SunrayInc/understanding-polyurethane-coefficient-of-friction, accessed Oct. 12, 2017.

Cristini, "Corrugated Techical Overview", http://www.cristini.com/vedit/15/img_download/CB-Corrugated-Technical-Overview.pdf, accessed Nov. 6, 2017.

Thomasnet.com Industry News, "Sticky-Pad Materials secure cell phones and tablets", https://news.thomasnet.com/fullstory/sticky-pad-materials-secure-cell-phones-and-tablets-20023047, accessed Nov. 6, 2017.

(56)                       References Cited

OTHER PUBLICATIONS

International Search Report and Written Opinion from the European Patent Office, acting as the International Searching Authority, for corresponding application PCT/US2012/056904, mailed Sep. 3, 2013.

Misumi USA: Industrial Configurable Components Supply, "Misumi Urethanes/Rubbers", https://us.misumi-ec.com/maker/misumi/mech/product/ur/faq/, accessed Jan. 18, 2018.

Pleiger Plastics Company USA, "Polyurethane Material Properties", https://pleiger.com/polyurethane-material-properties/, accessed Jan. 18, 2018.

Pellacani, Luigi et al.: "Advanced PU Elastomers for Demanding Wear Applications", *Defining the Future Through Technology: Polyurethanes Conference 2000; Westin Copley Place*, Boston Massachusetts, Oct. 8-11, 2000, © 2000 American Plastics Council, pp. 65-76.

Wikipedia Website: page for "Natural Rubber", see http://en.wikipedia..org/wiki/Natural_rubber, accessed 2020.

Young, Hugh D.: "Coefficient of Friction", *Fundamentals of Mechanics and Heat*, McGraw-Hill Book Company, copyright 1964, pp. 117-121.

Merriam-Webster: "Treatment Definition & Meaning", see https://www.merriam-webster.com/dictionary/treatment, accessed Jan. 11, 2023.

* cited by examiner

24 INCHES 6a
1/2 IN HOLE

1/4 IN ANGLE IRON 6b
1/2 IN HOLE 6c
1/2 IN HOLE

2

INSERT A 1/2 x 12 IN ALL-THREAD THROUGH EACH HOLE
AND PLACE WASHER AND NUT ON EACH END

24 INCHES

4a

4b

2a

4c

6 IN x 1/8 IN SCREW IN HOOKS
WITH THE ENDS CUT OFF WELDED
TO THE BOTTOM OF THE ANGLE IRON

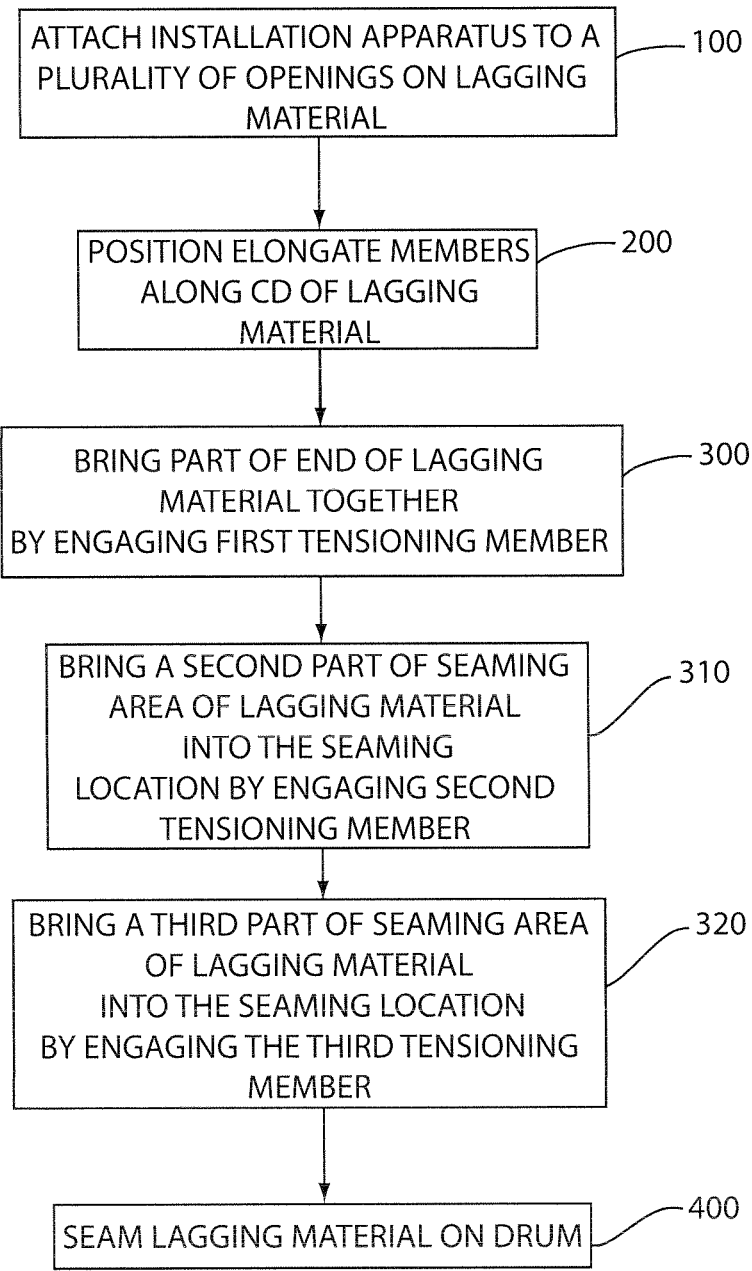

ATTACH INSTALLATION APPARATUS TO A PLURALITY OF OPENINGS ON LAGGING MATERIAL — 100

POSITION ELONGATE MEMBERS ALONG CD OF LAGGING MATERIAL — 200

BRING PART OF END OF LAGGING MATERIAL TOGETHER BY ENGAGING FIRST TENSIONING MEMBER — 300

BRING A SECOND PART OF SEAMING AREA OF LAGGING MATERIAL INTO THE SEAMING LOCATION BY ENGAGING SECOND TENSIONING MEMBER — 310

BRING A THIRD PART OF SEAMING AREA OF LAGGING MATERIAL INTO THE SEAMING LOCATION BY ENGAGING THE THIRD TENSIONING MEMBER — 320

SEAM LAGGING MATERIAL ON DRUM — 400

FIG. 5

DRUM LAGGING MATERIAL

CROSS REFERENCE TO RELATED APPLICATIONS

This application is a division of U.S. patent application Ser. No. 18/939,952 filed Nov. 7, 2024, now U.S. Pat. No. 12,343,956, which is a continuation of U.S. patent application Ser. No. 13/625,533, filed Sep. 24, 2012, now abandoned, which claims priority to U.S. provisional patent application No. 61/538,470, filed Sep. 23, 2011 and to U.S. provisional patent application No. 61/542,657, filed Oct. 3, 2011, each entitled "DRUM LAGGING MATERIAL AND INSTALLATION APPARATUS THEREFOR," and the entireties of each of which are incorporated herein by reference.

BACKGROUND OF THE INVENTION

The manufacture of corrugated paper board, or box board, on corrugator machines is well-known in the art. The manufacture of corrugated paper board, or box board, on corrugator machines is well-known in the art. An exemplary description of corrugator machines and their use can be found in U.S. Pat. No. 6,276,420, the entirety of which incorporated by reference hereby. In the manufacture of corrugated paper board, a so-called core paper is heated by steam, which makes it more pliable, and is then fed into a nip formed between a pair of toothed rollers whose teeth mesh, thereby corrugating the core paper in a uniform, undulating pattern. Starch paste is subsequently applied to the crests of the corrugated core paper, which is then mated to a liner paper in a roll nip. There, the corrugated core paper and liner paper are bonded together to form a completed sheet, which can then be further processed as desired.

In one machine used for this purpose in the prior art, the nip is formed by one of the toothed or corrugating rolls and a pressure roll. In another machine of a more recent design, the nip is extended in the running direction through the use of a belt instead of a pressure roll. The belt holds the corrugated core paper and liner paper together against the corrugating roll for a significant portion of its circumference.

On such machines, corrugator belts pull a continuous sheet of corrugated board first through a heating zone, where an adhesive used to bond layers of the continuous sheet together is dried or cured, and then through a cooling zone. The board is subsequently cut and processed into the desired shape to be used for making boxes. Frictional forces between the corrugator belt, specifically the face, or board, side thereof, and the continuous sheet are primarily responsible for pulling the latter through the machine. Corrugator belts must travel around cylindrical pulleys or drums in operation. Some of these drums are driven, which moves the corrugator belt through the machine as well as the corrugated board formed thereon in a continuous manner. A lagging material covers the drive drum surface in order to, among other things, keep the belt from slipping.

Conventional prior art lagging materials are manufactured in endless form and are typically uncoated or coated on one surface. Also, prior art lagging materials are installed on a drum by adhesive bonding, that is, using a very strong rubber contact cement like 3 M 1300 L, which adheres to the lagging material and to the drum surface. This lagging material is used to provide friction between the belt and driver roll in order to pull the belt and board through the machine section. There are many variations of lagging material, for example, woven lagging material, some rubber lagging material, lagging materials having different shaped surfaces, and so on. None of the prior art lagging structures have a seam or are on-machine seamable as the gluing process does not require it.

Prior art glued lagging materials must be replaced from time to time, either periodically (e.g., annually) or for other reasons. To replace it, a crew of people has to grind, scrape, and remove all the lagging material and glue off the drum to allow the new glue and lagging to be installed. In most cases, this requires several days of work and machine downtime.

SUMMARY OF THE INVENTION

In one embodiment, a seaming apparatus to install lagging material designed to be on machine seamable comprises at least two opposed elongate members, each elongate member being structured to be placed longitudinally along the cross-machine direction (CD) of a drum over opposing sides of a seaming area of a lagging material for installation of the lagging material on the drum. A plurality of lagging material engagement members are attached to each opposed elongate member; and a tensioning member is operably engaged with the opposed elongate members for drawing the opposed elongate members together in the machine direction (MD). Each lagging material engagement member is structured to engage a seaming area of the lagging material such that when the elongate members are drawn together, the lagging material is stretched into a seamable position to be installed on the drum surface.

In another embodiment, also disclosed is lagging material for use on a cylindrical pulley or drum or roll for an industrial machine, the lagging material comprising: a substrate; a seaming area for seaming opposing ends of a lagging material when brought together; and a first coating on a drum-contact outer surface of the substrate (i.e., inner with respect to the drum/drive roll of the machine), wherein the coating increases the Coefficient of Friction of the lagging material when the lagging material is installed onto the drum such that no adhesive is required to keep the lagging material on the drum. The lagging material can further comprise a second coating on the opposite outer surface of the substrate. The first or second coating can comprise a coating made from a thermoplastic or thermoset material. The coating can be an elastomer and can be selected from the group of a polyurethane, a rubber, silicone, and other known elastomeric materials. The coatings on each side of the lagging may be of made of the same material or different materials.

The lagging substrate can comprise at least one layer selected from the group of woven or non-woven fibers and/or yarns or spiral links. The fibers and/or yarns are selected from the group of: natural fibers and/or yarns and synthetic and/or fibers and/or yarns. The lagging material can also comprise at least two layers. For example, the lagging material can include a woven substrate layer and a fibrous batt material layer, the batt material being manufactured and applied by techniques known to ordinarily skilled artisans such as carding and needling respectively. The lagging material is manufactured such that it is stable in the cross-machine direction (CD). The cross-machine direction (CD) width of a drum of a corrugator machine is typically up to 5 meters or more. The lagging material is also extensible to a degree in the machine direction (MD) along the drum circumference such that it can be stretched sufficiently along the drum surface so as to be seamed on the drum surface yet also maintain that total length over the service life of the lagging material.

The lagging material can comprise a plurality of openings spaced along the cross-machine direction (CD) of the seaming area on each of the opposing ends of the lagging material, the openings being configured to receive the engagement members of an installation apparatus when the lagging material is placed around a drum's outer surface. The lagging material can also comprise each opening being substantially laterally paired in the machine direction (MD) with an opposing opening on the opposing end of the lagging material. The lagging material can be configured to be a lagging for a drum roll in a corrugator machine used in the manufacture of corrugated packaging board. The uncoated lagging material can be at a weight of from about 6.3 oz/ft2 (1.9 kg/m2) to about 10.5 oz/ft2 (3.2 kg/m2) and a caliper (thickness) of from about 0.162 inches (4.1 mm) to about 0.270 inches (6.9 mm). For example, the uncoated lagging material includes a weight of approximately 7 oz/ft2 (2.1 kg/m2) and a caliper (thickness) of approximately 0.180 inches (4.6 mm). Where the coated lagging material has only the first coating on the drum contact side, it can comprise a weight of from about 10.7 oz/ft2 (3.3 kg/m2) to about 17.9 oz/ft2 (5.4 kg/m2) and a caliper (thickness) of from about 0.192 inches (4.9 mm) to about 0.320 inches (8.1 mm). For example, the coated lagging includes a coated weight of about 11.9 oz/ft2 (3.6 kg/m2) and a caliper of about 0.213 inches (5.4 mm). Were the coated lagging material is coated on both the drum contact and sheet contact sides, the coated lagging material can comprises a weight of from about 15.1 oz/ft2 (4.6 kg/m2) to about 25.2 oz/ft2 (7.7 kg/m2) and a caliper (thickness) of from about 0.221 inches (5.6 mm) to about 0.368 inches (9.3 mm). For example, the coated lagging can include a coated weight of about 16.8 oz/ft2 (5.1 kg/m2) and a caliper of about 0.245 inches (6.2 mm).

In another embodiment, a method comprises: positioning opposing ends of a lagging material around a drum's/drive roll's for seaming; attaching an installation device to a plurality of openings on each opposing end of the lagging material, the openings configured to receive engagement members of the installation apparatus when the lagging material is placed around a drum's outer surface; bringing the ends of the lagging material into a seaming position with the installation apparatus; and seaming the lagging material onto the drum. The installation device and the process of installation of the lagging material on the drum stretches the lagging material onto the drum, and the lagging has a sufficient Coefficient of Friction such that no additional adhesive is required to keep the lagging in place on the drum during operation of the machine.

BRIEF DESCRIPTION OF THE FIGURES

For a more complete understanding of the invention, reference is made to the following description and accompanying drawings, in which:

FIG. 5 shows a flow chart for a method of seaming a lagging material on a drum.

It will be noted that the same reference numbers are used to refer to the same features throughout the Figures.

DETAILED DESCRIPTION OF THE PREFERRED EMBODIMENTS

Initially, although embodiments are disclosed in the context of a drive drum in a corrugator machine, ordinarily skilled artisans will appreciate that the disclosed embodiments of the lagging material and installation device have application to other drive roll covers or other industrial machines that include drive drums, such as papermaking machines and nonwovens manufacturing machinery.

Figure 1A:
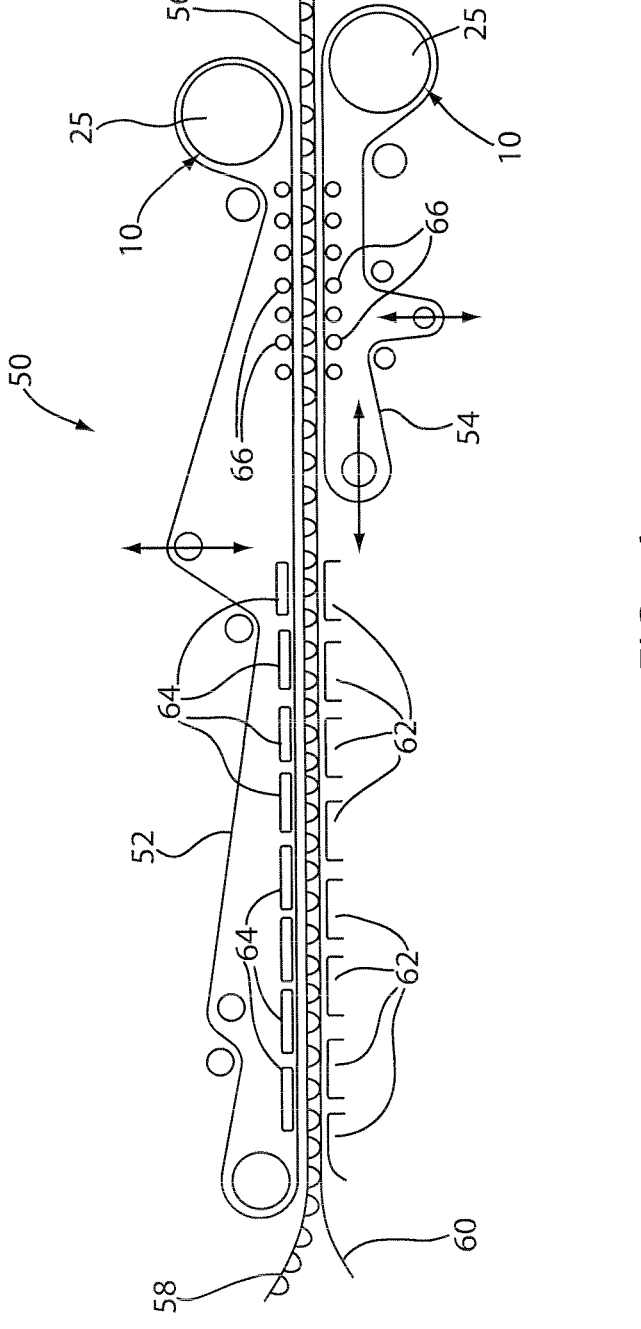
FIGS. 1A and 1B are a schematic view of a typical belted section of a corrugator machine.
Figure 1B:
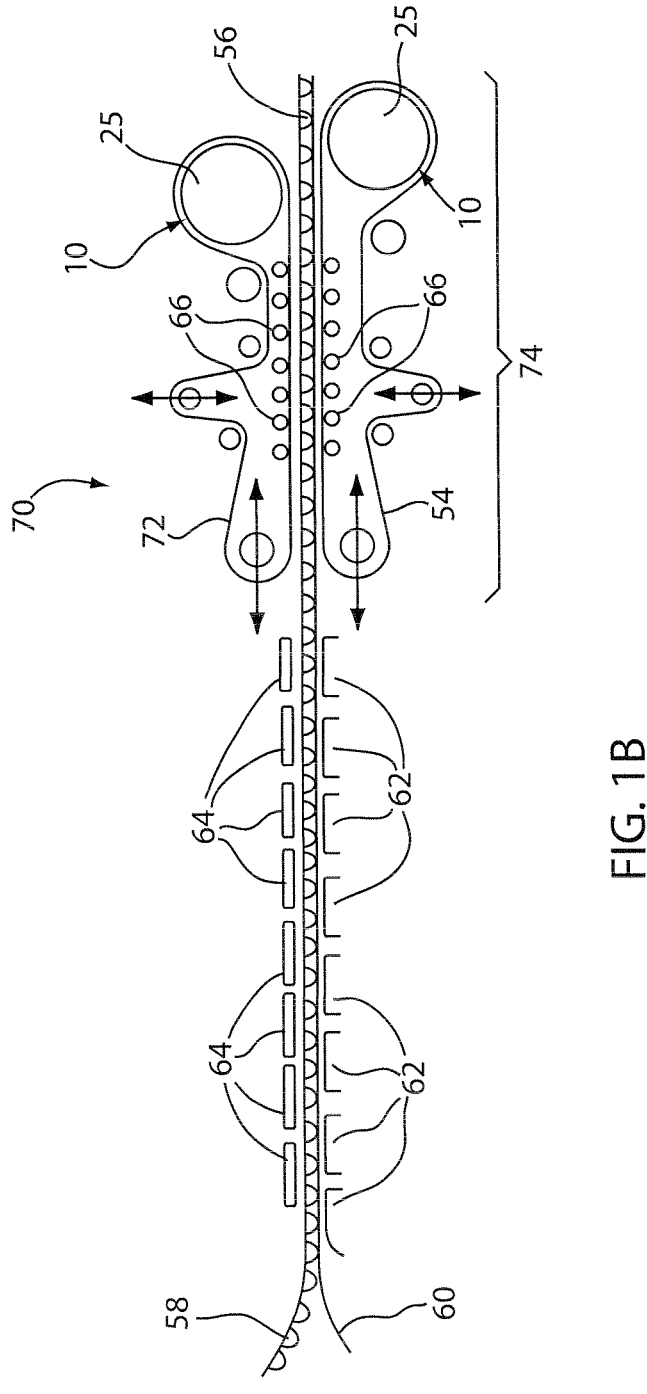

FIGS. 1A and 1B are schematic views of a typical belted section of a corrugator machine. A corrugator machine 50 in FIG. 1A has an upper corrugator belt 52 and a lower corrugator belt 54 which together support and pull a corrugated paper product 56 therethrough. After passing over hot plates 62, the upper and lower belts 52, 54 together pull the corrugated paper product 56 between them, maintaining the speed of the operation and cooling the paper product 56. Weighted rollers 66 apply pressure from within the endless loops formed by belt 52 and belt 54 toward one another, so that corrugated paper product 56 may be held therebetween firmly as the starch based adhesive (applied upstream from the present section) cures. Upon exit from between the upper and lower belts 52, 54, the corrugated paper product 56 is cut and/or stacked or further processed as required. Drums 25 have lagging material (not shown) installed on their surface.

FIG. 1B shows a doublebacker section in which the upper belt 52 is replaced with a much shorter corrugator belt 72. In this case, the upper belt 72 does not pass across the hot plates 62. Instead, the upper belt 72 is disposed opposite the lower belt 54 downstream from hot plates 62 in what may be referred to as cooling, or pulling, zone 74. In this variety of corrugator machine 70, weighted steel shoes push the corrugated paper product 56 against the hot plates 62. In this case, the upper and lower belts 72, 54 disposed downstream from hot plates 62 pull the corrugated paper product 56 through the machine 70. As before, weighted rollers 66 apply pressure from within the endless loops formed by belt 72 and belt 54 toward one another, so that corrugated paper product 56 is firmly held therebetween as the starch based adhesive cures. Upon exit from between belts 52, 54, the corrugated paper product 56 is cut and/or stacked. Drums 25 have lagging material (not shown) installed on their surface.

As will be appreciated, corrugator machines place the belts, and hence the drive drums 25 and pulleys, under highly stressful and adverse conditions. The belts 52, 54, 74 to operate properly, must move at the speed of the drum surface as the belt and board move through the section. This is achieved by applying lagging to the drum surface(s), lagging being a material that wraps around the drum surface and provides sufficient friction between the belt's inner surface (nonsheet surface) and the lagging to prevent the belt from slipping.

Conventional prior art lagging is be installed on a drum using a very strong rubber contact cement like 3 M 1300 L, which adheres to the lagging and to the drum surface.

Disclosed is a lagging sufficiently elastic in the machine direction (MD) and having other properties, such that it does not require adhesives such as those above to maintain grip on a drum, and an installation apparatus therefor. For example, in one embodiment shown in FIG. 2, disclosed is a double coated lagging material, with a coating on both the drum surface side (inside) and the belt contact side (outside), such that the inside coating has a Coefficient of Friction to prevent the lagging, once stretched and seamed, from slipping on the drum surface. As will be understood, although the embodiment shows a double-sided lagging, as the inside coating has a Coefficient of Friction to prevent the lagging from the slipping on the drum surface, embodiments also include a lagging material with a coating on only the drum surface side (inside), and not on the paper belt side.

As will be appreciated, as the belt is wrapping a steel drum, the single or double-coated lagging prevents the lagging from slipping on the drum and also prevents (or at least minimize) the belt from slipping on the lagging. For example, a coated lagging can have a Coefficient of Friction of about 7 times greater than that of a conventional lagging, as shown in the Table 1.

TABLE 1

|  | Average of Kstatic | Average of Kdynamic |
| --- | --- | --- |
| Conventional Lagging | | |
| steel | 0.30 | 0.26 |
| Coated Lagging | | |
| steel | 1.58 | 1.41 |

For such a lagging, it is advantageous to have, among other things, an efficient and effective way to install the lagging on the drum without glue adhesive. For example, lagging is replaced on a periodic basis due to wear or for other reasons. For a conventional prior art lagging material such as that heretofore described, once it is glued to the drum surface, in order to replace it (e.g. annually) a crew of people have to grind, scrape, and remove all the material off the roll/drum to allow the new glue and lagging to be installed. In most cases, this requires several days to accomplish while the machine is down and out of operation.

In various embodiments the lagging material is configured to be a lagging for a corrugator machine drive roll/drum in the manufacture of corrugated packaging board. There are many variations of lagging, some woven, some woven with needled batt, some coated on the belt (or non drum) surface contact side; however no conventional lagging material has a cross-machine direction (CD) seam or is made to be on machine seamable. Accordingly, in one embodiment, as shown at FIG. 2, disclosed is a lagging sufficiently elastic in the machine direction and having other properties such that it does not require strong adhesives or glue to remain on the surface of the drum 25 during operation. For example, in one embodiment, disclosed is a lagging including a double coated 19, 20 substrate 17, 18, with a coating 19, 20 on both sides of the lagging material 10, such that the Coefficient of Friction of the stretched lagging is sufficient for the lagging to remain in place on the exterior drum surface during operation of the machine and to prevent the corrugator belt from slipping on the drive drum while moving through the corrugator machine. The coatings 19, 20 can include thermoset or thermoplastic material. The coating on the outer surface 19 can be the same as that of the drum-contact surface 20, or can be different (i.e., a functional coating chosen for desired qualities for the inner/outer surfaces). Coatings 19, 20 can include elastomeric coatings selected from a polyurethane, a rubber, silicone, and other known materials (or combinations thereof).

Figure 2A:
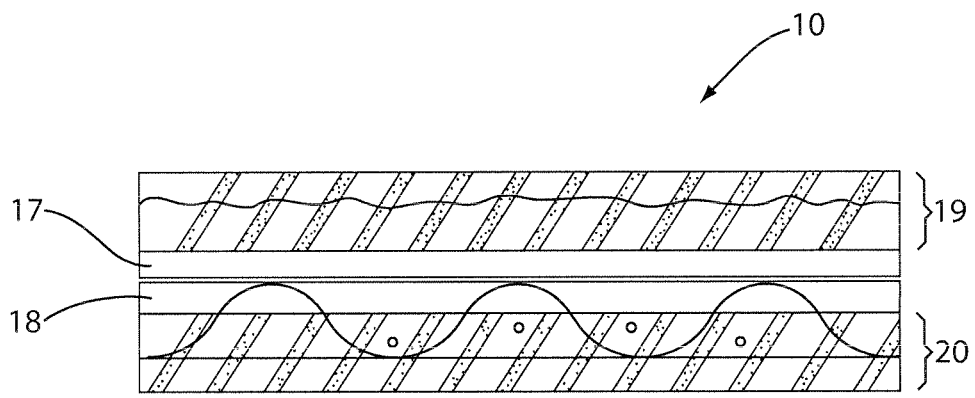
FIGS. 2A and 2B are a cross sectional views of a lagging material.
Figure 2B:
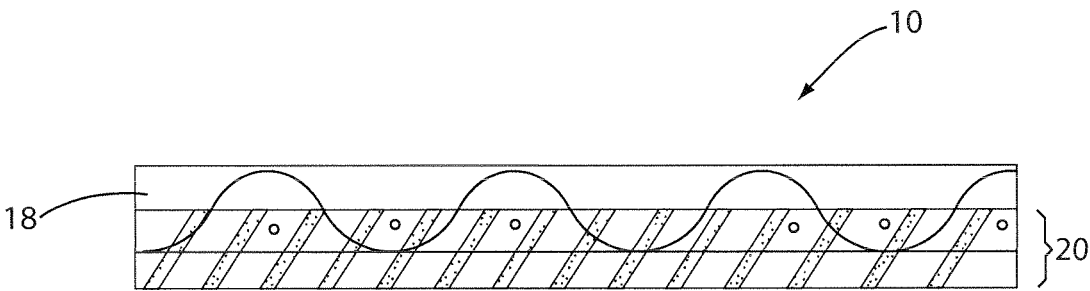

In another embodiment, shown at FIG. 2A, a lagging includes a lagging material 10 including a substrate 18 with a single coating 20 on only the drum surface side (inside). As will be understood, FIGS. 2A and 2B are exemplary embodiments of a double coated lagging material and single coated lagging material respectively, and the number of substrate layers, materials can vary in other embodiments.

Accordingly, specifications for a lagging material can be configured for use on industrial machines as described herein. Exemplary weights and caliper ranges for embodiments of the lagging including (1) an uncoated substrate, (2) a single coated lagging coated only on the drum contact side, or (3) double coated on the drum contact side and sheet contact side are given in Table 2 as follows.

TABLE 2

|  | Nominal Weight oz/ft2 | Low Range (−10%) oz/ft2 | High Range (+50%) oz/ft2 | Nominal Weight kg/m2 | Low Range (−10%) kg/m2 | High Range (+50%) kg/m2 |
| --- | --- | --- | --- | --- | --- | --- |
| Substrate | 7.0 | 6.3 | 10.5 | 2.1 | 1.9 | 3.2 |
| Single Coated | 11.9 | 10.7 | 17.9 | 3.6 | 3.3 | 5.4 |
| Double Coated | 16.8 | 15.1 | 25.2 | 5.1 | 4.6 | 7.7 |

|  | Nominal Caliper inches | Low Range (−10%) inches | High Range (+50%) inches | Nominal Caliper mm | Low Range (−10%) mm | High Range (+50%) mm |
| --- | --- | --- | --- | --- | --- | --- |
| Substrate | 0.180 | 0.162 | 0.270 | 4.6 | 4.1 | 6.9 |
| Single Coated | 0.213 | 0.192 | 0.320 | 5.4 | 4.9 | 8.1 |
| Double Coated | 0.245 | 0.221 | 0.368 | 6.2 | 5.6 | 9.3 |

As will be appreciated, the higher end of the range is elevated as there may be some machines that may need a thicker belt on one of the drive rolls so that the effective diameter (e.g., diameter of the roll together with thicknesses of the lagging and the corrugator belt) of the two drive rolls are the same and they pull the corrugator board at the same speed.

In one exemplary embodiment, a lagging material 10 of FIG. 2 can be a woven substrate with needled batt fiber 17, 18 formed from 100% percent synthetic fibers and yarns. As configured for a corrugator machine, specifications of a lagging can be, for example, the uncoated lagging material can be at a weight of about 7 oz/ft2 (2.1 kg/m2) and a thickness of about 0.180 inches (4.6 mm), the single coated lagging can weigh about 11.7 oz/ft2 (3.6 kg/m2) and the thickness is about 0.213 inches (5.4 mm), and the double coated lagging can weigh about 16.8 oz/ft2 (5.1 kg/m2) and the thickness is about 0.245 inches (6.2 mm).

Figure 3A:
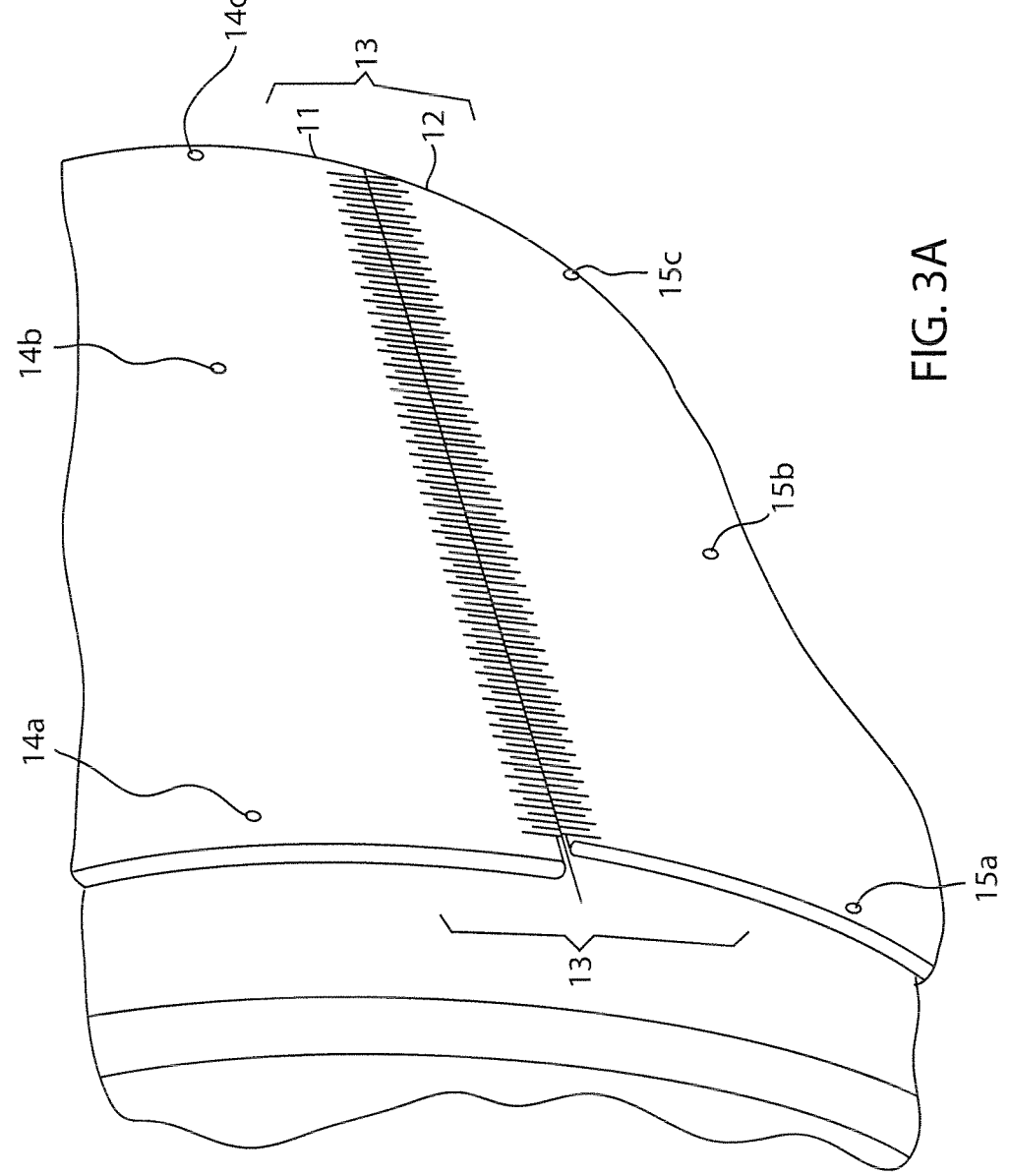
FIGS. 3A, 3B and 3C are a respectively a perspective view and a top view, and a side view of and embodiment of the lagging material as installed on the drum after stretching and seaming.
Figure 3B:
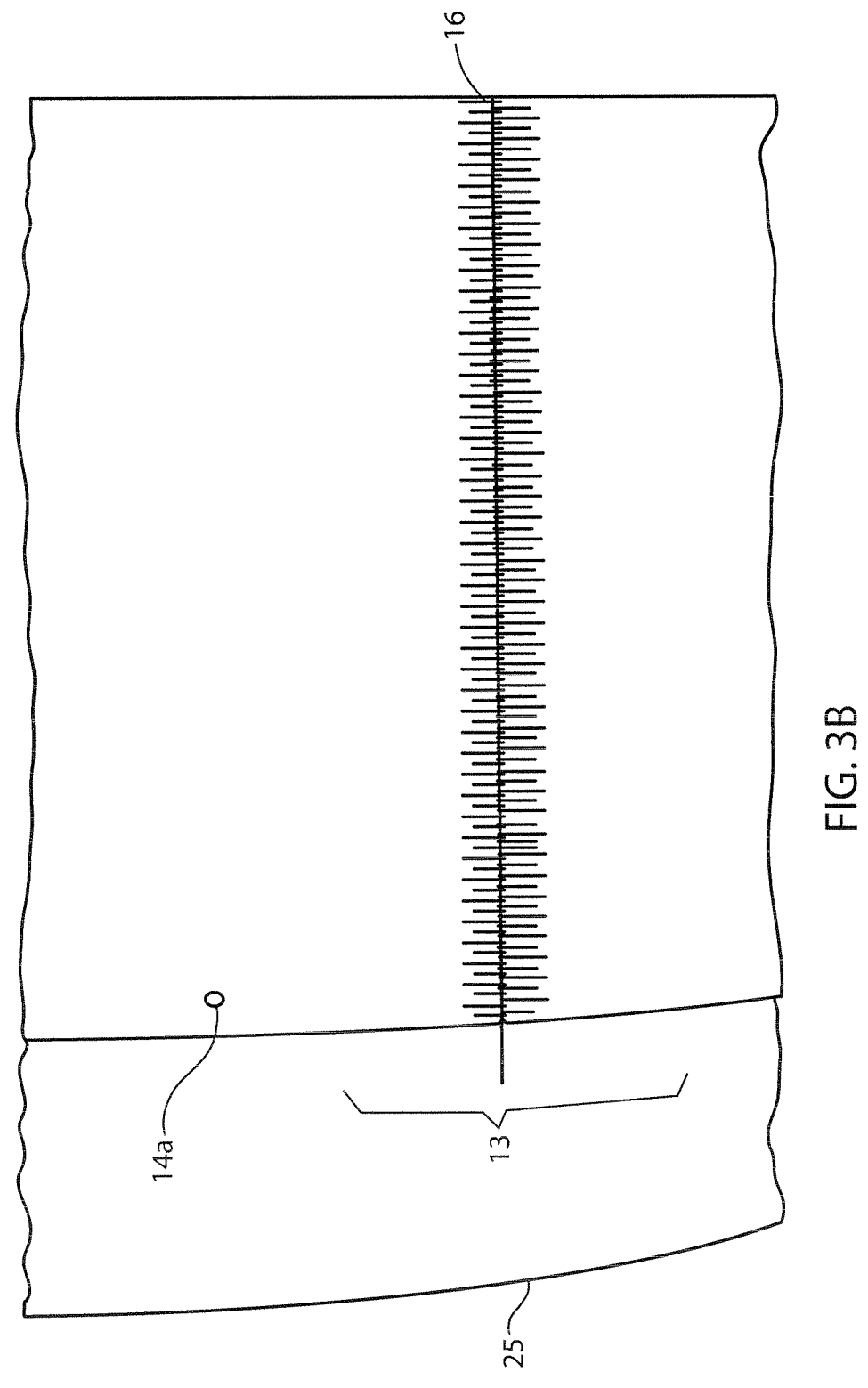
Figure 3C:
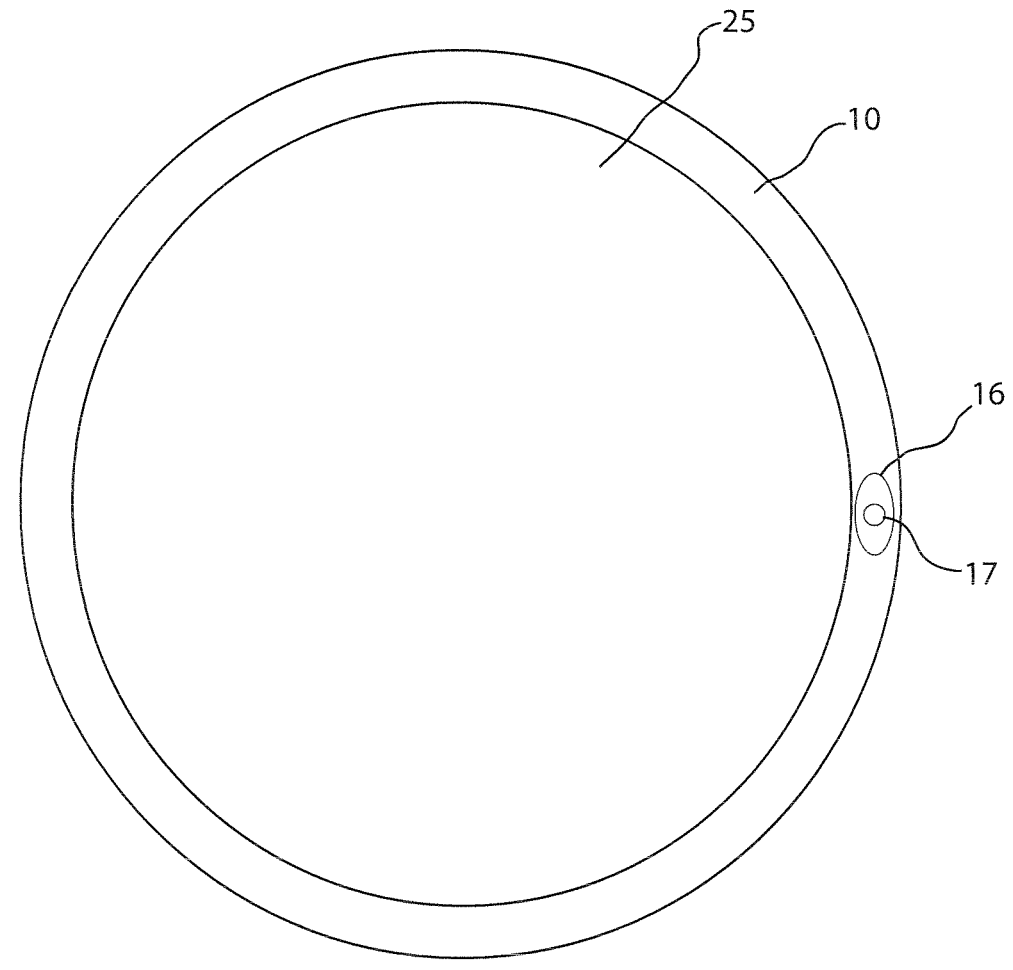

A seamable lagging material can be configured to be installed for use on a cylindrical pulley or drum for an industrial machine. In another embodiment, as shown in FIGS. 3A, 3B, and 3C, the lagging material 10 is made seamable for easy installation and removal from a drum 25. FIGS. 3A, 3B and 3C are a respectively a perspective view, a top view and a side view of the lagging material 10 as installed on a drum 25. The lagging material comprises a seaming area 13 for seaming opposing ends 11, 12 of a lagging material 10 when brought together. In FIGS. 3A and 3B, The seam area 13 is shown as a clipper hook seam 16, however as will be appreciated, the seam 16 can include seaming methods or elements known in the art of industrial fabrics, such as clipper hook seams, spiral-links, and pin-seams wherein the yarns of the substrate actually form seaming loops themselves, or any other seaming method such that the seaming elements for each edge of the lagging can be interdigitated, forming a tunnel in which a pin or pintle 17 can be inserted therein. So too are other non-pintle or pin methods of seaming as known to those of ordinary skill in the art within the scope of disclosed embodiments, as for example, sewn or seamed webbing where seaming tabs affixed at the ends 11, 12 of the lagging material are joined with glue or studs in the through direction to seam the fabric. As shown, the ends 11, 12 of the lagging material are connected to the seam 16, and the ends 11, 12 of the seam 16 have been connected with a pin.

Figure 4A:
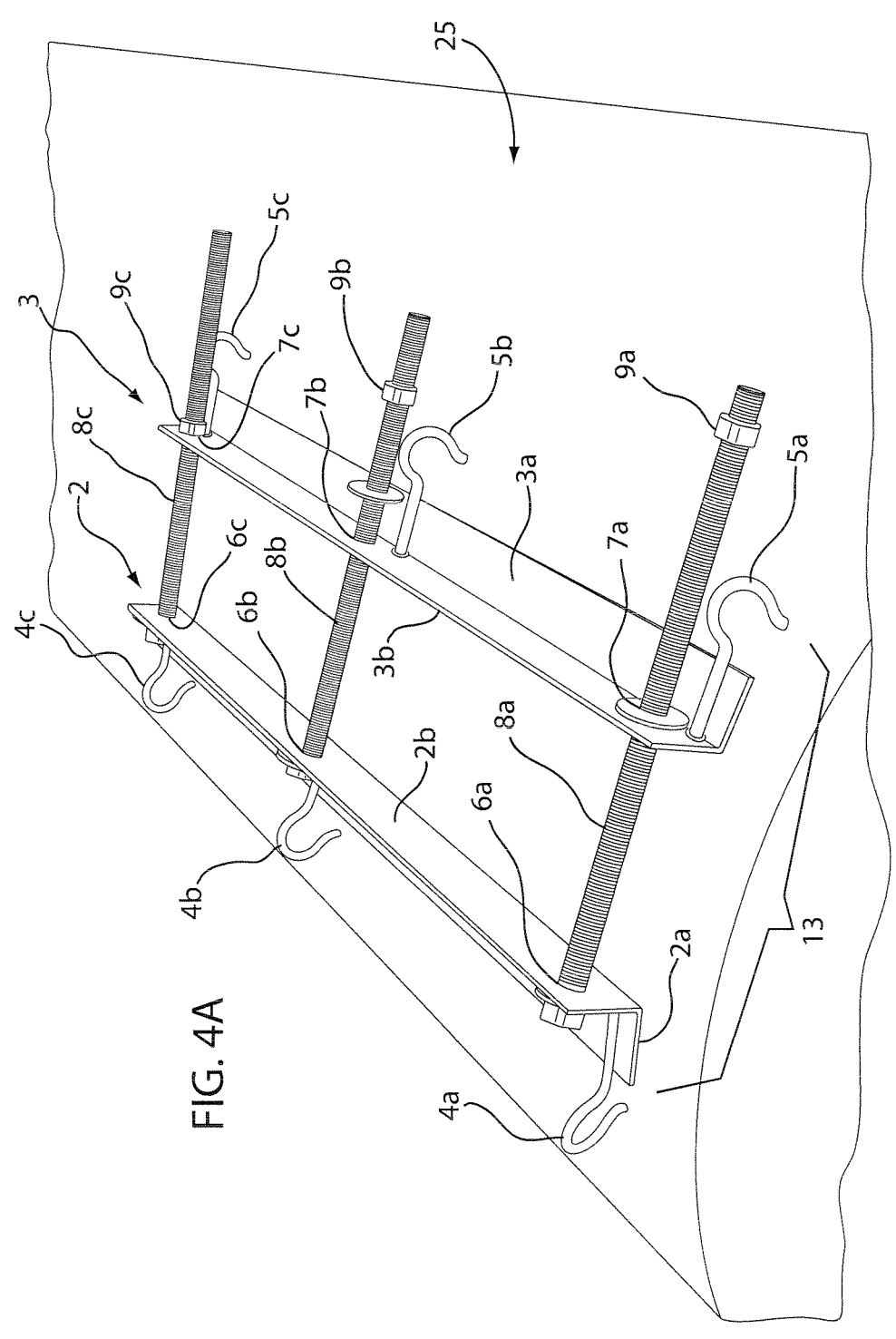
FIG. 4A shows a perspective view of an installation apparatus for installing a lagging material on a drum.
Figure 4B:
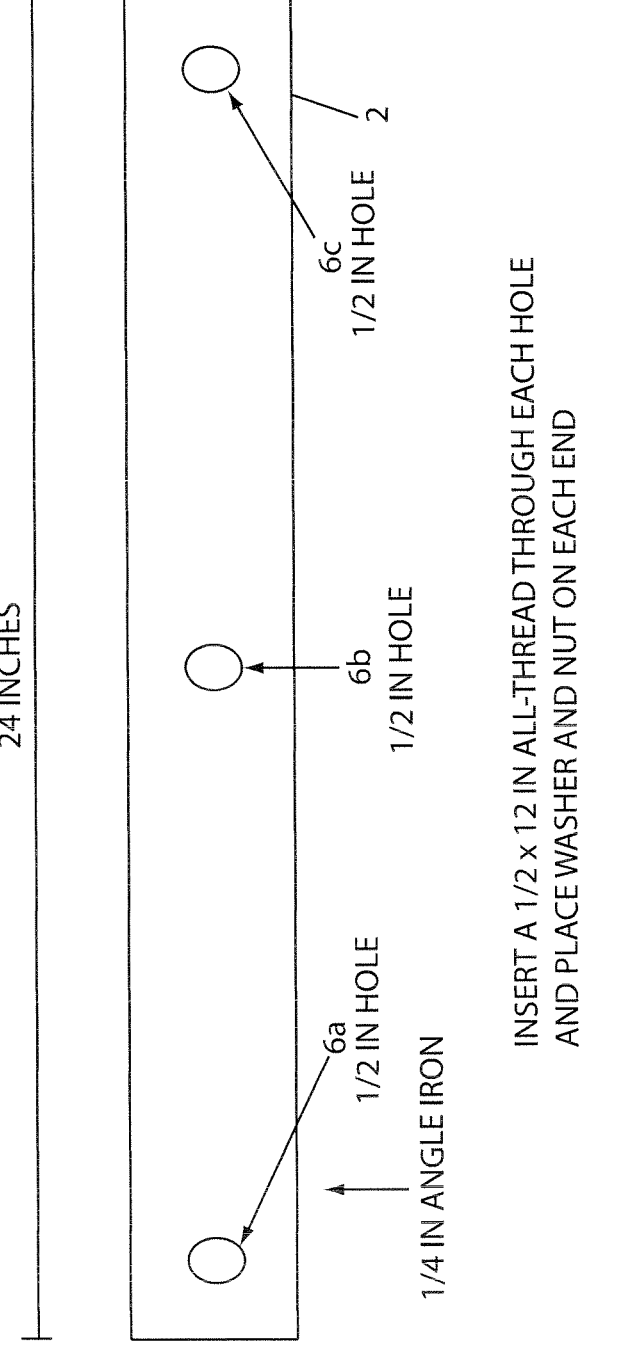
FIG. 4B is a plan view of a portion of the lagging material installation apparatus.
Figure 4C:
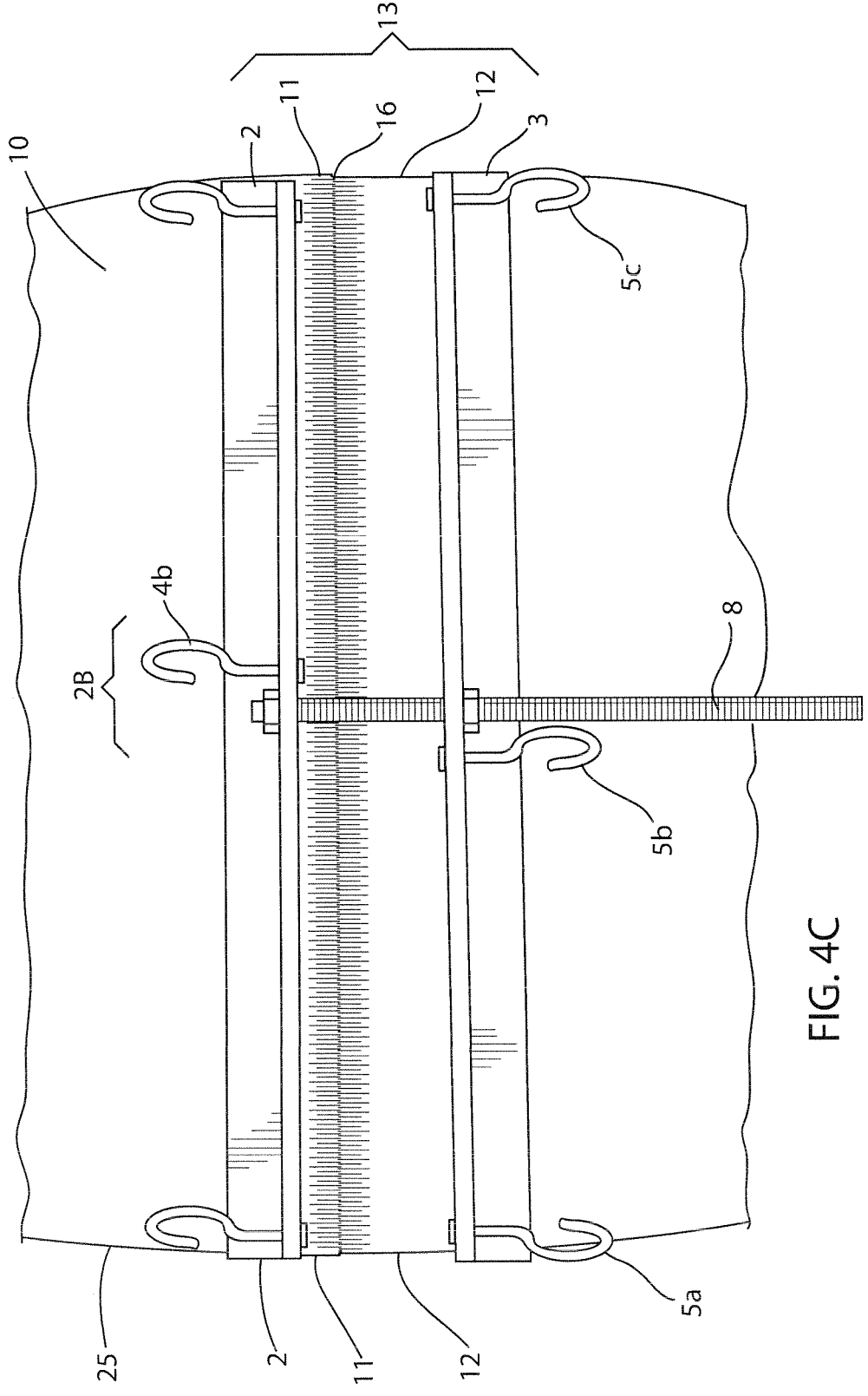
FIG. 4C is a plan view of lagging material installation apparatus as shown in FIGS. 4A and 4B in conjunction with a lagging material being installed on a drum.

FIGS. 4A and 4C are respectively a perspective view and plan view of an installation device 1 for installing a seamable lagging material 10 onto a drum surface. The apparatus comprises two opposed elongate members 2, 3 each elongate member 2, 3 being structured to be placed longitudinally along the cross-machine direction (CD) of a drum 25 over opposing sides of a seaming area 13 for a seam 16 of a lagging material 10 for installation of the lagging material 10 on the drum 25. The elongate members 2, 3 can be substantially the same width as the cross-machine direction (CD) width of the lagging material 10 itself. For example, for a lagging installed on a drum/pulley of a corrugator machine, the elongate member can be about 24 inches (610 mm), which is the cross-machine direction (CD) size/dimension for such a lagging. As will be understood, corrugator machines can have drums of cross-machine direction (CD) widths of 5 meters (approximately 200 inches) or more. Thus the lagging material 10 as just described could be applied in circumferential strips, and thus installed on the drum 25 in sections until the full surface is covered. However, the installation tool can be configured to the desired cross-machine direction (CD) width for any lagging size 10, including up to a cross-machine direction (CD) width where a "full size" lagging 10 can be installed in one piece on a drum 25.

In one embodiment the each elongate member comprises a base portion 2a, 3a and an upright portion 2b, 3b, such as an angle iron as is shown. For example, each elongate member is aligned in the cross-machine direction (CD) and placed over each end 11, 12 of a flat (non-continuous and unseamed) lagging 10 that is wrapped around a drum 25 for installation thereon. The base of the angle iron is placed along the cross-machine direction (CD) on the drum over one joining end 11 of the lagging 10, and the upright portion 2b, 3b of the angle iron stands substantially perpendicular to the drum. Each elongate member 2 is configured to be substantially laterally paired in the machine direction (MD) with an opposing elongate member 3 around the seam area 13 when installing the lagging material 10 on the drum 25. As will be understood, while the elongate member is shown as an angle iron, other embodiments are contemplated. For example, instead of an angle iron, a rod or planar element could be structured to act as an installation apparatus.

A plurality of lagging material engagement members 4, 5 can be attached to each opposed elongate member 2, 3. For example, a plurality of hook elements 4a, 4b, 4c, 5a, 5b, 5c are attached to each respective elongate member 2, 3. As shown in FIG. 4A, three lagging material engagement elements 4a, 4b, 4c, and 5a, 5b, 5c attached to each opposed elongate member 2, 3. As shown in FIG. 4A, the hooks are attached to the bottom upper surface of the base 2a, 3a of the elongate member 2, 3 as the plurality of hook elements 4a, 4b, 4c 5a, 5b, 5c are each attached to the angle iron 2, 3.

FIG. 4B is a plan view showing the elongate member 2 further comprising an angle iron; and the plurality of hook elements 4a, 4b, 4c are each attached to the angle iron 2. For example, in the embodiment three 6 inch by ⅛ inch (152 mm by 3.12 mm) hooks 4a, 4b, 4c are welded to the bottom of the angle iron 2, which gives sufficient strength to withstand the tensile strain on the apparatus 1 when installing the lagging material 10 onto the drum, as described herein.

As will be understood, other embodiments of engagement devices 4, 5 can be employed, such as clasps. Also, any number of techniques may be used to attach engagement devices 4, 5 such as welding, screwing, or hooking to an elongated member 2, 3.

As shown in FIGS. 4A-4D, the lagging material engagement members 4, 5 are spaced at substantially regular intervals along the cross-machine direction (CD) of each of the elongate members 2, 3. The substantially regular intervals as described herein account for differentials in the intervals for various embodiments. For example, as shown in FIG. 4B, the middle engagement member 4b can be somewhat off-center by a measurement sufficient to allow a tensioning member 8 to be operatively included in the installation apparatus. For example, for an elongate member 2 that is 24 inches (610 mm) in cross-machine direction (CD), the space between engagement member 4a and engagement member 4b can be from about 9 to about 11 inches (from about 228 mm to about 279 mm), and the space between engagement member 4b and engagement member 4c can be from about 15 to about 13 inches (from about 381 mm to about 330 mm). In an embodiment where each elongate member 2, 3 is similarly made, this allows for an offset 28 of from about 1 to about 3 inches (25 to about 76 mm) between engagement members which are paired in the machine direction (MD) as described below and shown clearly in FIG. 4C.

Each lagging material engagement member 4, 5 is positioned to engage the seaming area 13 at corresponding openings 14, 15 on the lagging material 10. For example, as shown in FIG. 4A, one elongate member 2 has three hooks 4a, 4b, 4c, each of which are positioned to engage one end 11 of the lagging material at corresponding openings 14a, 14b, 14c on the lagging material 10. The hooks 4a, 4b, 4c spaced at substantially regular intervals along the cross-machine direction (CD) of the lagging material 10. The opposing elongate member 3 has three hooks 5a, 5b, 5c, each of which are positioned to engage an opposing end 12 of the lagging material at corresponding openings 15a, 15b, 15c on the lagging material 10. The hooks 4a, 4b, 4c and 5a, 5b, 5c are spaced at substantially regular intervals of each elongate member along the cross-machine direction (CD). The corresponding openings 14a, 14b, 14c and 15a, 15b, 15c are also spaced at substantially regular intervals along the cross-machine direction (CD) of the ends of the lagging material 11, 12. This configuration causes the ends of the lagging material 11, 12 to come together and meet in the seaming area 13 when the installation apparatus is employed, as discussed herein.

As shown on FIGS. 4A and 4C, each lagging material engagement member 4a, 4b, 4c on one elongate member 2 is substantially laterally paired in the machine direction (MD) with an opposing lagging material engagement 5a, 5b, 5c member on the opposing elongate member 3. As shown, hook 4a is paired in the machine direction (MD) with hook 5a, hook 4b is paired in the machine direction (MD) with hook 5*b*, and hook 4*c* is pared in the machine direction (MD) with 5*c*. As explained above, the hooks are positioned to engage corresponding openings 14*a*, 14*b*, 14*c* and 15*a*, 15*b*, 15*c* in the lagging material, and as such, each opening 14, 15 is substantially laterally paired in the machine direction (MD) with an opposing opening 14*a*, 14*b*, 14*c* member on the lagging material 10 when the lagging material is wrapped around a drum 25 for installation thereon. As shown, opening 14*a* is paired in the machine direction (MD) with hook 15*a*, opening 14*b* is paired in the machine direction (MD) with hook 15*b*, and opening 14*c* is paired in the machine direction (MD) with 15*c*. Again, as shown in FIG. 4C, a pairing in the machine direction (MD) allows for some differential, as for example between engagement members 4*b* and 5*b*, which have an offset 28 in the cross machine direction (CD) to allow for a tensioning member 8 to be operably engaged with the elongate members.

Figure 4D:
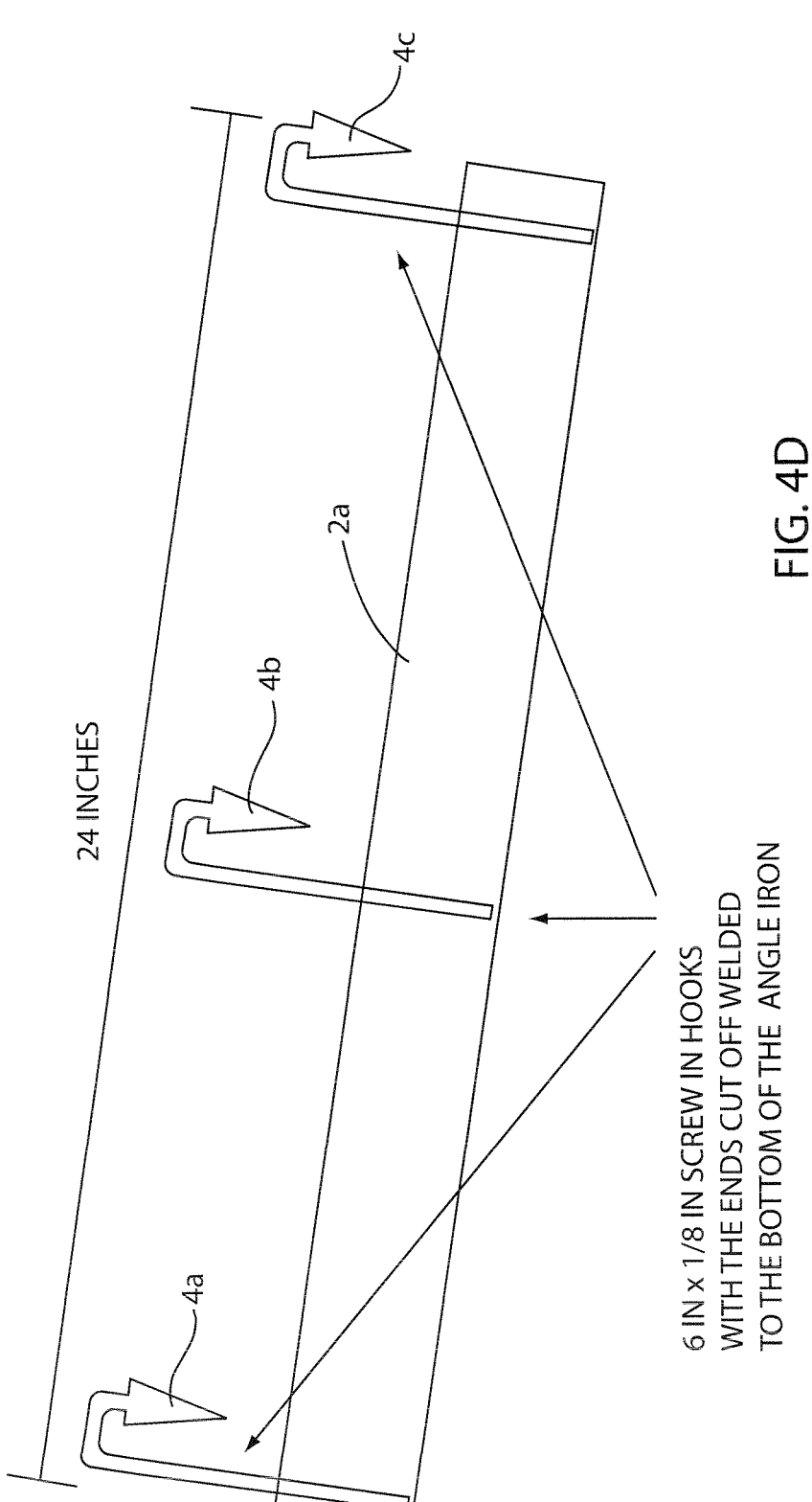
FIG. 4D is a side view of the installation apparatus.

The apparatus comprises a tensioning member 8 operably engaged with the opposed elongate members 2, 3 for drawing the opposed elongate members 2, 3 and consequently the lagging ends together in the machine direction (MD). In one embodiment, the apparatus comprises a plurality of tensioning members 8*a*, 8*b*, 8*c*, but as is apparent, the apparatus can be configured to have any number of tensioning members 8*n*. As shown in FIGS. 4A and 4C, the tensioning device 8 can be an all-screw or threaded bolt. FIG. 4D shows a side view of the one elongate member 2.

In another embodiment, tensioning member 8 can be acome-along winch (not shown). The come-along can operably engaged with the opposed elongate members 2, 3 for drawing the opposed elongate members 2, 3 and consequently the lagging ends together in the machine direction (MD).

As shown, the elongate member 2 is a one quarter inch (6.4 mm) angle iron, the side view showing the upright portion 2*b* of the angle iron. Holes 6*a*, 6*b*, and 6*c* are drilled into the angle iron at substantially regular intervals. As will be noted, the measurement from hole 6*a* to holes 6*b* and from hole 6*b* to hole 6*c* are about the same, and hole 6*b* is in the center of the upright portion 2*b*.

When opposing elongate members 2, 3 are in an installation configuration, as shown in FIGS. 4A and 4C, the inner faces of the upright portions 2*b*, 3*b* face one another, while the base portions 3*a*, 3*b* laterally extend away from one another. The tensioning members 8*a*, 8*b*, 8*c* extend transversely through the holes 6*a*, 6*b*, and 6*c* and corresponding holes 7*a*, 7*b*, 7*c* on the opposing elongate members 2, 3. As shown in the FIGS. 4A and 4C, the tensioning member 8 is a screw with a bolt end against one outside surface of one upright portion 2*b* of the elongate member 2 and a nut 9 on the outside surface of the upright portion 3*b* of the opposing elongate member 2. As shown in FIG. 4C, middle holes 6*b*, 7*b* in the upright portions 2*b*, 3*b* of the elongate members 2, 3 allow the tensioning member 8 to transversely thread the holes 6*b*, 7*b* at approximately the center of the installation apparatus 1. As explained above, the engagement members 4*b*, 5*b* are attached to the elongated members 2, 3 such that they are offset 28 so as to allow the middle tensioning member 8 to extend transversely between engagement members 4*b*, 5*b* between the offset 28. The tensioning members 8*a*, 8*b*, 8*c* are positioned proximate to the respective machine direction (MD) paired lagging material engagement members 4*a*, 5*a*; 4*b*, 5*b*; and 4*c*, 5*c*. This causes the tensioning member to place a direct pulling force on the respective machine direction (MD) paired engagement members 4*a*, 5*a*, 4*b*, 5*b*, and 4*c*, 5*c* when the tensioning device is operated to draw the elongated members 2, 3 together.

In an embodiment where the tensioning member 8 is a come-along winch (not shown), the come-along can operably engaged with the opposed elongate members 2, 3 for drawing the opposed elongate members 2, 3 together in the machine direction (MD) as follows. When opposing elongate members 2, 3 are in an installation configuration, as shown in FIGS. 4A and 4C, the inner faces of the upright portions 2*b*, 3*b* face one another, while the base portions 3*a*, 3*b* laterally extend away from one another. The tensioning members 8 can be positioned such that a pair of hooks from the winch engages transversely through the holes 6*a* and 7*a* such that the winch can be operated to pull the opposing elongate members 2, 3 at that position. The winch can be similarly engaged at holes 6*b* and 7*b* and again at 6*c* and 7*c* respectively.

Each lagging material engagement member is structured to engage a seaming area 13 of the lagging material such that when the elongate members are drawn together, the lagging material is stretched into a seamable position to be installed on the drum.

Accordingly, a seamable lagging material can be configured to be installed for use on a cylindrical pulley or drum for an industrial machine using an installation apparatus. In another embodiment the lagging material 10 as shown in FIGS. 3A and 3B is configured to be installed using embodiments of the installation apparatus 1 as described in FIGS. 4A-4D. FIGS. 3B and 3C are respectively a perspective view and a top view of the lagging material 10 as installed on the drum 25. The lagging material comprises a seaming area 13 for seaming opposing ends 11, 12 of a lagging material 10 when brought together. In the embodiment shown, the openings are placed on either side of the seam area 13 in the lagging material. The lagging material 10 includes a plurality of openings 14, 15 spaced along the cross-machine direction (CD) of the seaming area 13 on each of the opposing ends 11, 12 of the lagging material, the openings configured to receive engagement members 4, 5 of an installation apparatus 1 when the lagging material 10 is placed around the drum. As explained above, engagement members 4*a*, 4*b*, 4*c* from an installation device 1 are substantially laterally paired in the machine direction (MD) with an opposing lagging material engagement 5*a*, 5*b*, 5*c*. The engagement members 4*a*, 4*b*, 4*c* 5*a*, 5*b*, 5*c*, are respectively positioned to engage corresponding openings 14*a*, 14*b*, 14*c* and 15*a*, 15*b*, 15*c* on the lagging material 10. Each opening 14*a*, 14*b*, 14*c* on one end is substantially laterally paired in the machine direction (MD) with an opposing openings 15*a*, 15*b*, 15*c* on the lagging material 10 when the lagging material is wrapped around a drum 25 for installation thereon. As can be seen in FIG. 5C, the openings 14*a*, 14*b*, 14*c*, 15*a*, 15*b*, 15*c* did not experience rips or tears during the installation process with the installation apparatus 1.

A method for installing a lagging material using the device embodiments described herein is disclosed. Consistent with the embodiments of the installation apparatus 1 described in FIGS. 4A-4D, disclosed is a method comprising positioning opposing ends 11, 12 of a lagging material 10 around a drum 25 into for seaming. As shown in FIG. 5, at block 100 is shown attaching an installation apparatus 1 to a plurality of openings 14, 15 on each opposing end 11, 12 of the lagging material, the openings 14, 15 being configured to receive engagement members 4, 5 of the installation apparatus 1 when the unstretched lagging material 10 is placed around the drum 25 circumference bringing the ends
11, 12 of the lagging material into a seaming position at the
seam area 13 by engaging the seaming apparatus compo-
nents to stretch the lagging material in the machine direction
(MD) with the installation apparatus 1; and completing the
seam of the lagging material 10 onto the drum 25. The
installation of the lagging material 10 on the drum 25
stretches the lagging material 10 onto the drum, and the
lagging material surface in contact with the drum surface
with a sufficient Coefficient of Friction such that no adhesive
is required to keep the lagging from slipping on the drum
surface.

At block 200, the method comprises positioning at least
two opposed elongate members 2, 3 longitudinally along the
cross-machine direction (CD) of a drum 25 over the oppos-
ing sides 11, 12 of a seaming area 13 of the lagging material
10 and attaching a plurality of lagging material engagement
members 4, 5 attached to each opposed elongate members 2,
3 along the cross-machine direction (CD) to the plurality of
openings 14, 15, the openings being correspondingly spaced
along the cross-machine direction (CD) of the seaming area
13 on each of the opposing ends 11, 12 of the lagging
material. At least three of the lagging material engagement
devices correspond to at least three of the spaced openings
at each of the opposing ends 11, 12 of the lagging material
10. As described above the lagging material engagement
members can further comprise hook elements, and the
method includes engaging each hook at a corresponding
opening on the lagging material. The lagging material
engagement members are spaced at substantially regular
intervals along the cross-machine direction (CD), as
described herein.

Consistent with the description of the installation device
1 herein, the method further comprises engaging each lag-
ging material engagement member 4 on one elongate mem-
ber 2 with the openings 14 on one end 11 of the lagging
material 10, and engaging each lagging material engagement
member 5 on the opposing elongate member 3 with the
openings 15 laterally positioned in the machine direction
(MD) on the opposing end 12 of the lagging material 10.

At blocks 300-320, the method comprises bringing the
ends 11, 12 of the lagging material together by operating a
tensioning member 8 operably engaged with the opposed
elongate members 2, 3 for drawing the opposed elongate
members 2, 3 together in the machine direction (MD);
wherein each lagging material engagement member 2, 3 is
structured to engage a seaming area 13 of the lagging
material 10 such that when the elongate members 2, 3 are
drawn together, the lagging material is stretched into a
seamable position to be installed on the drum. In one
embodiment, the method includes operating a plurality of
tensioning members 8a, 8b. 8c positioned proximate to each
of the engagement members as described herein. While the
apparatus can be configured to have any number of tension-
ing devices 8a . . . n, in the embodiment where the tensioning
device is three threaded bolts or screws, an operator or
operating mechanism could tighten the nuts 9a, 9b, 9c, on
each of the screws such that the elongate members 2, 3 pull
the opposing ends 11, 12 of the lagging material 10 together
into a seaming position.

In an embodiment where the tensioning member 8 is a
come-along winch (not shown), the come-along winch 8 can
be positioned such that a pair of hooks from the winch
engages transversely through the holes 6b and 7b such that
the winch can be operated to pull the opposing elongate
members 2, 3 at that position. For example, as block 300 first
engages the come-along winch to bring the ends of the lagging material into the seaming position, which may be
sufficient to bring the whole seam 16 into the seaming
position, in which case the method moves directly to seam-
ing at 400. Or, as another alternative, the winch can be
similarly engaged in turns at holes 6a and 7a, 6b and 7b and
again at 6c and 7c respectively. An operator or operating
mechanism could place and operate the winch at each
location 6a, 7a; 6b, 7b; 6c, 7c such that the elongate
members 2, 3 pull the opposing ends 11, 12 of the lagging
material 10 together into a seaming position.

At block 400, once all three screws have been tightened
or the tensioning member otherwise operated such that the
seam 16 is in the seaming position, the lagging material 10
can be seamed on the drum 25 as for example, with a pin or
pintle.

It will thus be seen that the objects set forth above, among
those made apparent from the preceding description, are
efficiently attained and, because certain changes may be
made in carrying out the above method and in the construc-
tion(s) set forth without departing from the spirit and scope
of the invention, it is intended that all matter contained in the
above description and shown in the accompanying drawings
shall be interpreted as illustrative and not in a limiting sense.

What is claimed is:

1. An on-machine seamable lagging material for a drum
for an industrial machine selected from a papermaking
machine, nonwovens manufacturing machine, or a corruga-
tor machine for the manufacture of corrugated packaging
board, the lagging material comprising:
   a woven substrate made from synthetic yarns, the woven
   substrate having a belt-contact side and a drum-contact
   side;
   a first coating on the drum-contact side of the woven
   substrate,
   wherein the first coating has a higher coefficient of friction
   than the woven substrate; and
   a cross-direction seam, the seam configured to couple a
   first end of the woven substrate to a second end of the
   woven substrate.

2. The lagging material of claim 1, further comprising:
   a first batt layer in between the woven substrate and the
   first coating.

3. The lagging material of claim 2, further comprising:
   a second batt layer on top of the belt-contact side of the
   woven substrate.

4. The lagging material of claim 3, wherein at least one of
the first batt layer or the second batt layer is needled to the
woven substrate.

5. The lagging material of claim 1, further comprising:
   a batt layer on top of the belt-contact side of the woven
   substrate.

6. The lagging material of claim 1, wherein the seam is a
clipper hook seam or a spiral link seam.

7. The lagging material of claim 1, further comprising:
   a second coating applied to the belt-contact side of the
   woven substrate.

8. The lagging material of claim 7, further comprising:
   a first batt layer in between the woven substrate and the
   first coating, and
   a second batt layer in between the woven substrate and the
   second coating.

9. The lagging material of claim 7, further comprising:
   at least one layer of batt in between the woven substrate
   and the first coating or the second coating.

10. The lagging material of claim 7, wherein the first
coating and the second coating are the same.

11. The lagging material of claim 7, wherein the first coating and the second coating are different.

12. The lagging material of claim 1, wherein the lagging material is elastic in a machine direction (MD) of the industrial machine.

13. The lagging material of claim 1, wherein the lagging material has a thickness in a range from 0.221 to 0.368 inches.

14. The lagging material of claim 1, wherein the lagging material has a thickness in a range from 0.192 inches to 0.320 inches.

15. The lagging material of claim 1, wherein the first coating includes an elastomer and is thermoset or thermoplastic.

16. The lagging material of claim 1, further comprising a plurality of openings adjacent the cross-direction seam, the plurality of openings configured to receive an installation apparatus when the lagging material is placed around a roll or drum.

17. The lagging material of claim 16, wherein the first and second ends of the woven substrate comprise a plurality of openings adjacent the cross-direction seam.

18. The lagging material of claim 1, wherein an average static coefficient of friction of the lagging material is $Ks=2.81$ and an average dynamic coefficient of friction of the lagging material is $Kd=2.44$.

19. The lagging material of claim 1, wherein an average static coefficient of friction of the lagging material is $Ks=1.58$ and an average dynamic coefficient of friction of the lagging material is $Kd=2.41$.

20. The lagging material of claim 1, further comprising a pin or pintle for coupling the first end of the woven substrate to the second end of the woven substrate.

\* \* \* \* \*